March 18, 1958  L. THOMPSON  2,827,285
MOVING PICTURE PROJECTOR FOR FILM HAVING SOUND TRACK
Filed May 26, 1952  2 Sheets-Sheet 1

INVENTOR.
Lloyd Thompson
BY
ATTORNEY.

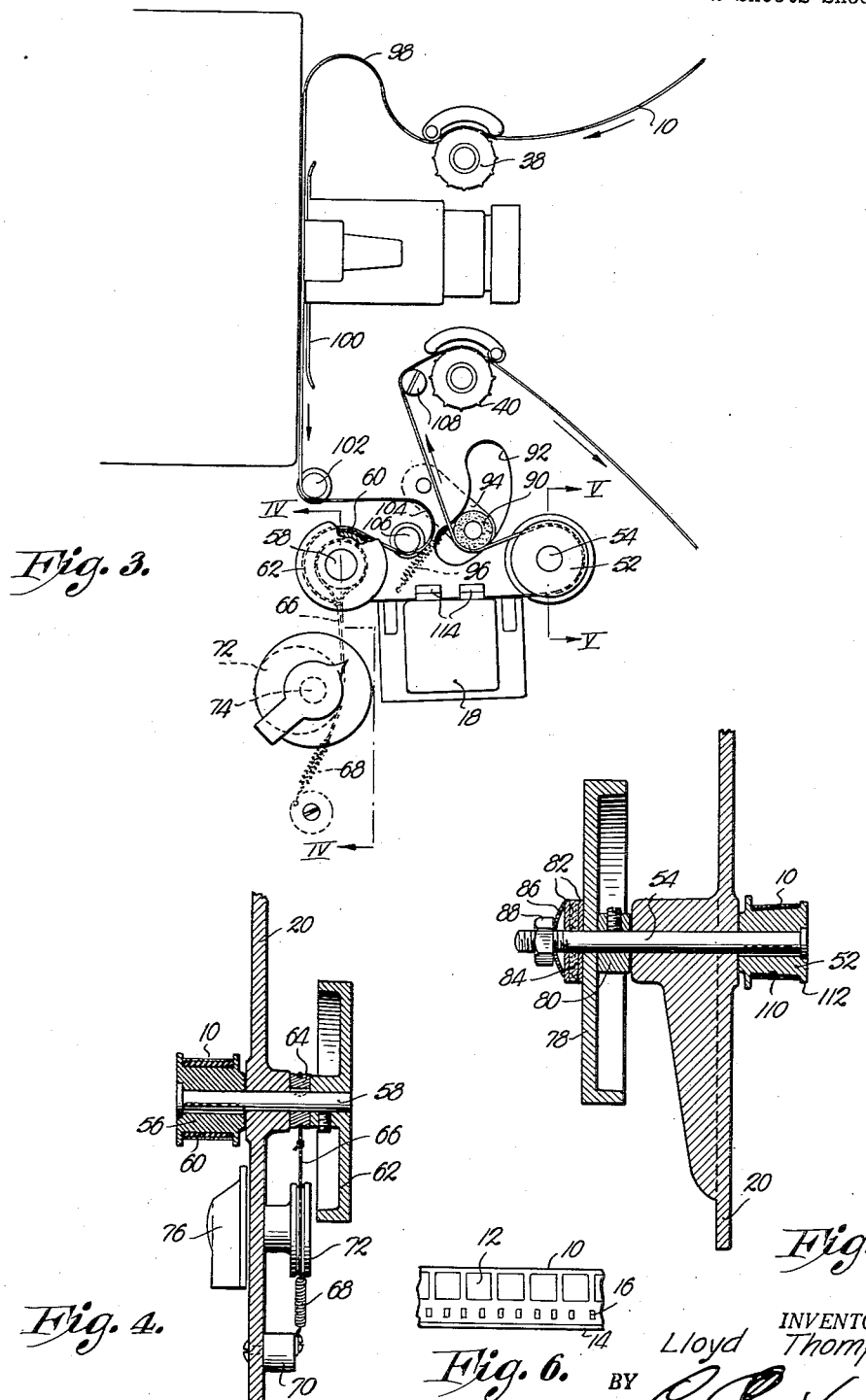

United States Patent Office 2,827,285
Patented Mar. 18, 1958

2,827,285

MOVING PICTURE PROJECTOR FOR FILM HAVING SOUND TRACK

Lloyd Thompson, North Kansas City, Mo., assignor of fifteen percent to B. C. Calvin, thirty percent to Forrest O. Calvin, both of Johnson County, Kans., and twenty-five percent to Chester Lawrence Sherwood, Liberty, Mo.

Application May 26, 1952, Serial No. 289,991

2 Claims. (Cl. 271—2.3)

This invention relates to improvements in effecting and controlling the motion of film through motion picture apparatus such as moving picture projectors and particularly to film-drive mechanisms for sound film, the primary object being to adapt 8 millimeter film to use with recorder-playback heads by eliminating sprocket hole flutter or sprocket hole modulation, and "wow," and to accurately guide the film across such heads.

It is well appreciated in this field that there are many problems in the utilization of magnetic 8 millimeter sound-on film recorder projectors that are not ordinarily found in 16 or 35 millimeter optical or magnetic sound tracks.

The primary problem is, as above indicated, the removal of sprocket hole flutter or modulation. Secondly, the film motion must be extremely good in 8 millimeter sound film because of the slow speed that is necessary in advancing the same across the recorder and playback heads. Third, the sound track on 8 millimeter magnetic film is in the nature of a very narrow edge stripping and therefore, the film must be guided accurately over the recorder and playback heads to obtain satisfactory results. These problems all must be met simply and as cheaply as possible in order to produce a marketable system.

In the sound-on film recording industry, both the tight-loop system and the loose-loop system are generally recognized for use in both 16 and 35 millimeter film. Magnetic recording has brought forth a third system which is of the tight-loop type, utilizing the double flywheel principles. These systems have heretofore been unsatisfactory with 8 millimeter film however, because of the smallness of the film and the close proximity of the narrow sound track to the sprocket holes of the film. In most instances, wherein magnetic sound film is utilized today, the sound head must be placed so that the sound is recorded and removed at the sound drum. These machines have critical adjustments however, that are satisfactory only if the same film is used each time. Whenever another film having different characteristics is placed on the machine, the results become completely unacceptable without a complete readjustment of the system. Thus, the conventional methods used in 16 and 35 millimeter film are not practical for 8 millimeter use.

It is the most important object of this invention therefore, to provide film-drive mechanism wherein both the tight and the loose-loop systems are employed and in such manner as to maintain the film taut across the recorder and playback heads, and to not only smooth out or eliminate interruptions of speed caused by the drive sprocket, but those occasioned by the intermittent feed of the film past the picture gate.

Another object hereof is to provide feed mechanism for 8 millimeter sound films that includes a spring biased roller between the sound drum and the film advancing sprocket for maintaining the film taut across the sound heads and smoothing out interruptions whereby to produce continuous, uniform film movement past the sound head and thereby result in quiet, positive operation.

Another object hereof is to provide a loose-loop system between the picture gate and another rotatable drum adjacent the sound heads, the second drum being braked to assure the taut condition of the film across the sound heads and to cooperate with the loose-loop system in avoiding undesired noise.

Other objects of this invention include the provision of a braking system for one of the rotatable drums around which the film passes that is adjustable by the operator; the provision of flywheels for moderating fluctuations in speed, one of the flywheels being loosely mounted on its shaft to avoid damage to the film in initial starting but having yieldable means for coupling the same with such shaft; the provision of structure for guiding the film and assuring its rectilinear movement across the sound heads; and the provision of means to hold the film, particularly the sound track thereof, firmly against the recorder and playback heads across which the same advances.

In the drawings:

Fig. 3 is a front elevational, schematic view illustrating the manner of threading the film through the feed mechanism.

Fig. 4 is an enlarged, fragmentary, cross-sectional view taken on line IV—IV of Fig. 3.

Fig. 5 is an enlarged, fragmentary, cross-sectional view taken on line V—V of Fig. 3; and Fig. 6 is a fragmentary, top plan view of an 8 millimeter sound film adapted for use with the present invention.

Figure 1:
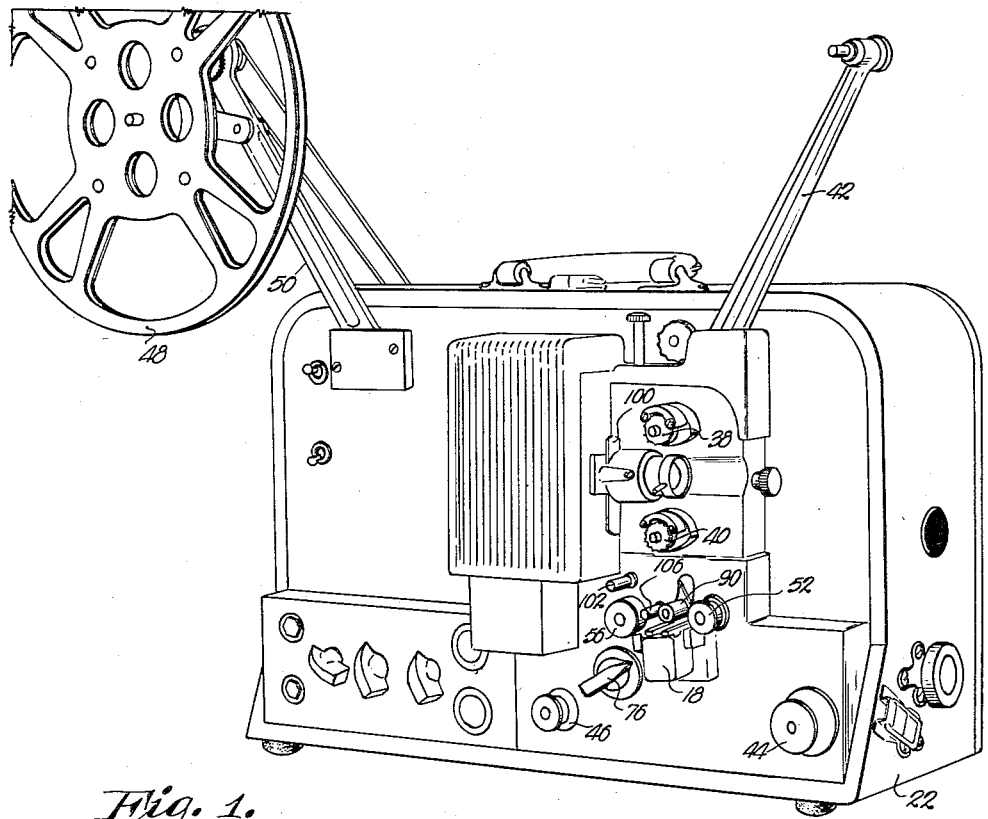
Figure 1 is a front perspective view of a recorder-projector having film-drive mechanism made according to the present invention and adapted particularly for 8 millimeter film, the front cover for the case being entirely removed and not shown.

A combination sound film recorder-playback projector is illustrated in Fig. 1 of the drawings and, so far as the present invention is concerned, the way in which the film 10 is initially developed to present images in frames 12 and to produce a rather narrow sound track 14, is of no consequence and need not be described. It is noted in Fig. 6, however, that the film 10 is provided with a row of sprocket holes 16 along one longitudinal edge thereof in the usual manner, and that the magnetic sound track 14 is relatively close to the row of perforations 16.

The recorder-playback head and the erase head are included in a single unit in the projector herein chosen for illustration and designated broadly by the numeral 18. During recording, one sound track 14 may be erased and another recorded automatically in the usual manner.

Figure 2:
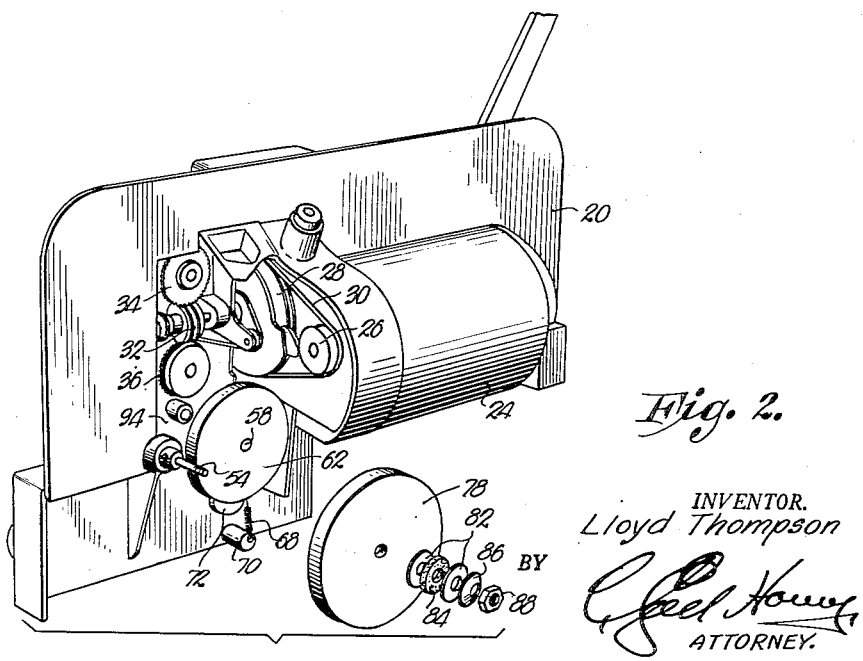
Fig. 2 is a rear perspective view showing the film-actuating mechanism per se and entirely removed from the case.

The mechanism forming the subject matter hereof and including the sound heads 18, is mounted upon a single panel 20 shown in Fig. 2 of the drawings entirely removed from case 22. The primary motivating means consists of an electric motor or the like 24 having a drive pulley 26 and is coupled with a driven pulley 28 by means of a continuous belt 30. The shaft for pulley 28 has a screw 32 in mesh with a pair of opposed gears 34 and 36. The shafts for gears 34 and 36 are provided with sprockets 38 and 40 respectively, sprocket 38 operating to feed film 10 to a picture gate 100 and sprocket 40 being provided to exert a pulling force upon the film 10 from the heads 18. Film 10 is advanced to the picture gate 100 by the sprocket wheel 38 from a reel not shown, rotatably secured to an arm 42 and sprocket 40 directs the film 10 as indicated by the arrow in Fig. 3 from the sound heads 18 to a pair of idlers 44 and 46, whence the film is re-coiled on a reel 48 drivingly mounted on arm 50.

A sound drum 52 secured to a shaft 54, is disposed on one side of the heads 18 thereabove, and a second drum 56 on the opposite side of the heads 18, is secured to a shaft 58 for rotation therewith. Shafts 54 and 58 are rotatably mounted in the panel 20 within substantially the same horizontal plane, to guide the film 10 across the heads 18 as hereinafter to be made more clear. The drum 56 has a friction surface 60 of rubber or like material, and the shaft 58 thereof is provided with a relatively small flywheel 62 (Figs. 2 and 4).

Suitable braking means for the shaft 58, and accordingly for the flywheel 62 and the drum 56 is provided, the type chosen for illustration including a small sheave 64 on the shaft 58. A cord or cable 66 is looped over the sheave 64 and has connection with a spring 68 that is in turn secured to the panel 20 by a boss 70. Adjustment of the braking means is through the medium of a grooved disc 72 eccentric with respect to a shaft 74 upon which it is mounted and engaging the cable or cord 66. An operating pointer knob 76 is secured to the shaft 74.

The shaft 54 is likewise provided with a flywheel 78 appreciably larger than the flywheel 62 and floatingly mounted on the shaft 54. A collar 80 on shaft 54 limits the extent of movement of the flywheel 78 longitudinally in one direction with respect to the shaft 54. A pair of metallic washers 82 and a resilient washer 84 made from felt or the like, are threaded on the shaft 54, together with a small, arcuate leaf spring 86 held in place by nut 88. Thus, the extent of yieldable bias of the flywheel 78 against the collar 80 is rendered adjustable by the nut 88.

A roller 90 projects through an arcuate slot 92 in panel 20 above the heads 18 and is rotatably mounted on an arm 94 that is swingably secured to the panel 20 for movement toward and away from the heads 18. The arm 94 is biased downwardly by means of a spring 96.

In threading the film 10, a loose-loop 98 is formed between the sprocket wheel 38 and the picture gate 100 in the usual manner. Film 10 thereupon pass from gate 100 beneath a stationary stud 102, and a second loop 104 is formed in the film 10 prior to its passage beneath a second stationary stud 106. Film 10 thereupon passes over and around the rotatable drum 56, thence across the heads 18, around and over the drum 52, beneath the roller 90 and thence over stud 108 to the sprocket wheel 40.

It is now apparent that no sprocket wheel flutter, occasioned by the engagement of the teeth of sprocket wheel 40, with the sprocket holes 16 of film 10, will be transferred to that part of the film overlying the heads 18 between the drums 52 and 56 because of the way in which the spring-loaded roller 90 keeps the film 10 taut between the drum 52 and the sprocket wheel 40. Any such speed variations will be smoothed out if not entirely eliminated, to the end that no interruptions will occur because of the film advancing sprocket 40. Additionally, the flywheel 78 on the shaft 54 for drum 52 will operate to moderate such fluctuations in speed or interruptions and thereby, cooperate with the tight-loop system in providing smooth, continuous and uniform, noiseless operation. By virtue of the fact however, that the flywheel 78 is not rigid to the shaft 54, there will be no damage to the film 10 and particularly to the sprocket holes 16 thereof in initial starting of the projector notwithstanding the relatively large diameter of the flywheel 78. When shaft 54 first commences to rotate by virtue of the action of sprocket 40, pulling the film 10 thereover, shaft 54 will rotate relative to the flywheel 78, whereupon spring 86 will subsequently cause the flywheel 78 to rotate at the same speed as the shaft 54.

The loose-loop system that includes loop 104 avoids any transfer of speed interruptions from the picture gate 100 to the heads 18. In addition, in order to eliminate all wow and flutter, the combination loose-loop and tight-loop system hereof is augmented by maintaining the film 10 in a taut condition between the drums 52 and 56, and no film distortion will occur by bending of the film since it is maintained relatively flat across the sound heads 18.

The braking means including sheave 64, cable 66, spring 68 and the eccentric cam 72, operates to prevent the drum 56 from free rotation. Sprocket 40 must force rotation of the drum 56 against the action of the braking means in order to rotate the drum 56.

In addition to the foregoing, it is highly essential, particularly in 8 millimeter film, to assure a true rectilinear path of travel thereof from drum 56 to drum 52. This is accomplished by providing a frusto-conical or tapered surface 110 in its drum 52 over which the film 10 passes, such surface 110 tending to force the film 10 outwardly against flange 112 on the drum 52. The sound track 14 adjacent the flange 112 is thereby guided in a straight path of travel across the heads 18.

Finally, it is essential for smooth, satisfactory operation, that the sound track 14 be held firmly against the sound heads 18 and therefore, each head 18 is provided with a small shoe 114 in overlying engagement with the film 10 above the sound heads 18.

With the provisions above set forth, it is apparent that variations in the characteristics of the film 10, including the width thereof and the straightness of the longitudinal edges of the film 10, do not deter the desired performance, most important of which is the elimination of flutter and other distortions that tend to affect the recording and playback of the sound film. While the invention has been developed primarily to adapt magnetic 8 millimeter sound-on film to practical use, it is appreciated that the principles hereof might well be applied to 16 millimeter or 35 millimeter optical or magnetic sound tracks with equal advantages, and it is therefore, desired to be limited only by the spirit of the invention as defined by the scope of the appended claims.

Having thus described the invention what is claimed as new and desired to be secured by Letters Patent is:

1. In motion picture apparatus having picture-gate mechanism, a sound head and a film advancing sprocket provided with teeth for engagement with spaced sprocket holes in the film, structure for maintaining the film taut across said head, eliminating sprocket wheel flutter, and moderating fluctuations in speed of travel of film across said head, comprising in combination, a rotatable sound drum on one side of the sound head and adapted to have said film pulled thereover; a shaft for the drum; means for maintaining a tight-loop system in the film between the sprocket and the drum including a swingable arm having a roller engaging the film between the drum and the sprocket and provided with spring means for holding the film taut whereby to eliminate said sprocket wheel flutter; a flywheel rotatable on said shaft, said flywheel having friction means connecting the same with the shaft whereby the same opposes and moderates said fluctuations in speed; a second rotatable drum on the opposite side of the sound head around which said film passes, said second drum having friction means engaging the tape for maintaining the latter taut between the drums, there being a loose-loop system in the film between the second drum and the picture-gate mechanism; a shaft for the second drum having a flywheel rigid thereto; and brake means for retarding rotation of the last mentioned flywheel whereby to maintain a constant, even tension in the film across the sound head.

2. The invention as set forth in claim 1 wherein said brake means is provided with means for varying the extent of retardation of the flywheel coupled with the second drum.

(References on following page)

References Cited in the file of this patent

UNITED STATES PATENTS

| | | |
|---|---|---|
| 1,713,726 | Vogt | May 21, 1929 |
| 1,831,562 | Heisler | Nov. 10, 1931 |
| 1,892,554 | Kellogg | Dec. 27, 1932 |
| 2,006,719 | Poulsen | July 2, 1935 |
| 2,013,109 | Reynolds | Sept. 3, 1935 |
| 2,092,064 | Hanna et al. | Sept. 7, 1937 |
| 2,106,338 | Block | Jan. 25, 1938 |
| 2,113,256 | Jeonne | Apr. 5, 1938 |
| 2,454,980 | Sobell | Nov. 30, 1948 |
| 2,532,761 | Blasio | Dec. 5, 1950 |
| 2,541,737 | Bardsley et al. | Feb. 13, 1951 |
| 2,618,710 | Camros | Nov. 18, 1952 |
| 2,646,989 | Davis | July 28, 1953 |
| 2,658,951 | Albee | Nov. 10, 1953 |